United States Patent
Nikbin et al.

(10) Patent No.: US 11,566,105 B2
(45) Date of Patent: Jan. 31, 2023

(54) SEMI-BATCH PROCESS FOR MAKING POLYCARBONATE POLYOLS VIA COPOLYMERIZATION OF CARBON DIOXIDE AND AN OXIRANE

(71) Applicant: Dow Global Technologies LLC, Midland, MI (US)

(72) Inventors: Nima Nikbin, Lake Jackson, TX (US); David A. Babb, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 756 days.

(21) Appl. No.: 16/346,859

(22) PCT Filed: Nov. 9, 2017

(86) PCT No.: PCT/US2017/060754
§ 371 (c)(1),
(2) Date: May 1, 2019

(87) PCT Pub. No.: WO2018/089568
PCT Pub. Date: May 17, 2018

(65) Prior Publication Data
US 2019/0309126 A1 Oct. 10, 2019

Related U.S. Application Data

(60) Provisional application No. 62/434,664, filed on Dec. 15, 2016, provisional application No. 62/420,918, filed on Nov. 11, 2016.

(51) Int. Cl.
| | | |
|---|---|---|
| *C08G 64/34* | (2006.01) | |
| *C08G 64/02* | (2006.01) | |
| *C08G 65/26* | (2006.01) | |
| *C08L 69/00* | (2006.01) | |
| *B01J 27/26* | (2006.01) | |
| *B01J 31/18* | (2006.01) | |
| *C08G 64/20* | (2006.01) | |
| *C08G 18/44* | (2006.01) | |

(52) U.S. Cl.
CPC .............. *C08G 64/34* (2013.01); *B01J 27/26* (2013.01); *B01J 31/1805* (2013.01); *C08G 18/44* (2013.01); *C08G 64/0208* (2013.01); *C08G 64/205* (2013.01); *C08G 65/2603* (2013.01); *C08G 65/2663* (2013.01); *C08L 69/00* (2013.01); *B01J 2531/0238* (2013.01)

(58) Field of Classification Search
CPC ...... B01J 27/26; C08G 18/44; C08G 64/0208; C08G 64/205
USPC .......... 524/83, 260, 345; 528/196, 198, 405; 502/242, 246
See application file for complete search history.

(56) References Cited

U.S. PATENT DOCUMENTS

| | | | |
|---|---|---|---|
| 9,006,347 B2 | 4/2015 | Williams et al. | |
| 2011/0118435 A1* | 5/2011 | Williams | .............. 502/242 |
| 2013/0048935 A1 | 2/2013 | Gotti et al. | |
| 2013/0072602 A1* | 3/2013 | Gurtler | ........... C08K 5/47 524/99 |
| 2013/0190462 A1 | 7/2013 | Wolf | |
| 2014/0323670 A1 | 10/2014 | Muller | |
| 2015/0259475 A1 | 9/2015 | Muller | |

FOREIGN PATENT DOCUMENTS

| | | |
|---|---|---|
| EP | 2791206 A | 10/2014 |
| WO | 2010/028362 A | 3/2010 |
| WO | 2010/062703 A | 6/2010 |
| WO | 2012/071505 A | 5/2012 |
| WO | 2014/184578 A | 11/2014 |
| WO | 2016/012785 A | 1/2016 |

* cited by examiner

*Primary Examiner* — Terressa Boykin

(57) ABSTRACT

Polycarbonate polyols are made by copolymerizing carbon dioxide and an alkylene oxide in the presence of a starter compound and a carbonate catalyst. The process is operated in semi-batch mode by combining starter, catalyst and a small amount of alkylene oxide in a reaction vessel, pressurizing the vessel with carbon dioxide, initiating polymerization, and then feeding both carbon dioxide and alkylene oxide to the vessel under polymerization conditions without removal of product until the feeds are completed.

10 Claims, No Drawings

SEMI-BATCH PROCESS FOR MAKING POLYCARBONATE POLYOLS VIA COPOLYMERIZATION OF CARBON DIOXIDE AND AN OXIRANE

This invention relates to a semi-batch process for making carbonate polyols.

Polycarbonate polyols can be made by copolymerizing carbon dioxide and an oxirane in the presence of a hydroxyl-functional starter and certain catalysts.

Various processes have been described previously. In processes such as those described in U.S. Pat. Nos. 6,762,278, 7,977,501 and 9,062,156, carbon dioxide and an orixane are polymerized using a double metal cyanide catalyst complex such as a zinc hexacyanocobaltate complex.

In WO 2010/028362, WO 2010,071505 and WO 2012/071505 are described processes for forming polycarbonate polyols using certain coordination catalysts. U.S. Pat. No. 9,006,347, WO 2014/184578 and WO 2016/012786 describe certain double metal coordination catalysts for making polycarbonates. These processes are batch or semi-batch processes in which all of the oxirane is charged to the reaction vessel at the outset of the reaction. At large scales, the high initial concentration of oxirane in the reaction vessel represents a serious safety issue, because a highly exothermic and potentially explosive runaway reaction can take place if temperature is not carefully controlled.

This invention is a semi-batch process for making a polycarbonate polyol. The process comprises the steps of:

a) combining a hydroxyl-containing starter compound, a carbonate catalyst and 0.25 to 5 moles of alkylene oxide per mole of the hydroxyl-containing starter compound in a reaction vessel;

b) introducing carbon dioxide into the reactor;

c) initiating polymerization of the carbon dioxide and alkylene oxide by subjecting the hydroxyl-containing starter compound, carbonate catalyst, alkylene oxide and carbon dioxide in the reaction vessel to polymerization conditions that include a temperature of at least 40° C. and a pressure of at least 138 kPa gauge (20 psig);

d) continuously or intermittently feeding additional alkylene oxide and carbon dioxide into the reaction vessel under polymerization conditions including a temperature of up to 150° C. without removal of product such that the alkylene oxide and carbon dioxide copolymerize to form the polycarbonate; and e) after all the alkylene oxide has been fed to the reaction vessel, recovering the product polycarbonate polyol from the reaction vessel.

This semi-batch process produces a polycarbonate polyol having a high proportion of carbonate units and a low proportion of homopolymerized oxirane. The process can be operated at moderate temperatures and pressures. This is an important benefit, as the reaction vessel does not need to be designed for high pressure operation.

The alkylene oxide may be, for example, ethylene oxide, 1,2-propylene oxide, 1,2-butylene oxide, 2,3-butylene oxide, 1,2-hexane oxide, styrene oxide and the like. A mixture of any two or more of the foregoing can be used. The alkylene oxide preferably is 1,2-propylene oxide by itself or a mixture of at least 50 mole-% 1,2-propylene oxide and up to 50 mole-% of ethylene oxide. 1,2-propylene oxide by itself is most preferred.

The starter is one or more organic compounds having at least one hydroxyl group. The starter may have a number average of, for example, at least 1.5, at least 2.0, at least 2.2, at least 2.5, at least 2.8, or at least 3 hydroxyl groups per molecule. The starter may have a number average of up to 8, up to 6 or up to 4 hydroxyl groups per molecule. The starter may have, for example, a hydroxyl equivalent weight of at most at most 3000, at most 1500, at most 1000, at most 750 and at most 500, at most 350 or at most 250.

Examples of useful monoalcohol starters include unsaturated or saturated aliphatic monoalcohols having, for example, up to 30, up to 20 or up to 12 carbon atoms, such as methanol, ethanol, isopropanol, n-propanol, n-butanol, t-butanol, 1-hexanol, 1-octanol, 1-decanol, 1-docecanol, vinyl alcohol, 1-propen-3-ol, 1-buten-4-ol, 1-hexen-6-ol, 1-heptene-7-ol, 1-octen-8-ol, 1-nonen-9-ol, 1-decen-10-ol, 1-undecen-11-ol, 1-dodecen-12-ol, allyl alcohol, hydroxyethylacrylate, hydroxypropylacrylate, hydroxyethylmethacrylate, hydroxypropylmethacrylate and the like. Examples of polyfunctional starters include water, ethylene glycol, diethylene glycol, triethylene glycol, propylene glycol, dipropylene glycol, tripropylene glycol, 1,4-butane diol, 1,6-hexane diol, glycerine, trimethylolpropane, trimethylolethane, pentaerythritol, erythritol, and the like. The starter may be an alkoxylate, such as a propoxylate and/or ethoxylate, of any of the compounds mentioned in the preceding two sentences having a number average molecular weight of up 1000, especially up to 500 g/mol. Especially preferred starters are dipropylene glycol, diethylene glycol, glycerine and/or trimethylolpropane, and alkoxylates thereof having 2 to 4 hydroxyl groups per molecule and a hydroxyl equivalent weight of 125 to 500, especially 125 to 350 or 125 to 250.

In the process of the invention, the starter compound is combined with a carbonate catalyst, 0.25 to 5 moles of alkylene oxide per mole of the hydroxyl-containing starter compound and solvent, if any, in a reaction vessel. The order of addition is not especially critical.

It is generally preferred to purge the headspace of the reaction vessel before initiating the reaction to remove oxygen, water and other reactive species (other than carbon dioxide). This can be done, for example, by flushing the headspace with nitrogen, argon, and/or carbon dioxide one or more times and/or pulling a vacuum on the headspace of the vessel, before introducing the carbon dioxide and initiating the polymerization reaction.

Carbon dioxide is then introduced into the reaction vessel. It is generally introduced in the form of a gas. The addition of carbon dioxide generally pressurizes (increases the internal pressure of) the reaction vessel.

This carbon dioxide may be added while the reactor contents (starter, catalyst and alkylene oxide) are already at a temperature sufficient to initiate polymerization. In such a case, it is desirable to introduce enough carbon dioxide to achieve a reactor pressure as indicated below with regard to the initiation step.

Alternatively, the carbon dioxide can be added while the reactor contents are at a temperature below that needed to initiate polymerization. In such a case, enough carbon dioxide is added so that when the reactor contents are heated to the initiation temperature, the reactor pressure is as indicated below with regard to the initiation step.

Polymerization is initiated by subjecting the reaction vessel containing the starter, catalyst, the alkylene oxide added during step a) and the carbon dioxide added in step b) to polymerization conditions that include a temperature of at least 40° C. and a pressure of at least 138 kPa gauge (20 psig). Such conditions may exist immediately upon adding carbon dioxide to the reactor in step b). The temperature during the polymerization initiation step may be at least 50°

C., at least 80° C., at least 100° C. or at least 120° C., and may be, for example, up to 200° C., up to 180° C. or up to 160° C. The reactor pressure at the start of the polymerization initiation step (i.e., immediately prior to the start of polymerization) may be, for example, at least 275 kPa gauge (40 psig), at least 345 kPa gauge (50 psig), at least 550 kPa gauge (80 psig) or at least 690 kPa gauge (100 psig), and may be, for example, up to 5.2 MPa (750 psig), up to 1.73 MPa gauge (250 psig), up to 1 MPa gauge (150 psig) or up to 965 kPa gauge (140 psig). The start of polymerization (and therefore completion of the initiation step) is typically indicated by a drop in reactor pressure due to the consumption of alkylene oxide and/or carbon dioxide.

After polymerization has become initiated, additional propylene oxide and carbon dioxide are continuously or intermittently fed to the reaction vessel under reaction conditions. Suitable reaction conditions include the presence of the catalyst, a temperature of at least 20° C. but not higher than 150° C., and a pressure of at least 138 kPa gauge (20 psig). The pressure conditions during this step d) may be within the ranges described with regard to the polymerization initiation step c). An advantage of this invention is that moderate pressure conditions can be employed. A preferred pressure during step d) is at least 275 kPa gauge (40 psig) up to 1.1 MPa gauge (165 psig), or at least 275 kPa gauge (40 psig) up to 965 MPa gauge (140 psig). Another advantage of the invention is that moderate temperature conditions can be used. The temperature preferably is at least 25° C. or at least 30° C. but no greater than 120° C., no greater than 110° C. or no greater than 100° C. An especially preferred temperature range is 50 to 90° C. Lower temperatures during step d) have been found to lead to higher levels of carbon dioxide incorporation into the polymer, particularly when a double metal cyanide complex is the catalyst.

During step d), the carbon dioxide and alkylene oxide are fed continuously or intermittently to the reactor. They can be fed separately or as a mixture. If fed separately, they preferably are fed simultaneously It is preferred to feed carbon dioxide and the alkylene oxide simultaneously so as to maintain a predetermined molar ratio of carbon dioxide and alkylene oxide within the reactor as described below during the entire course of step d).

If the carbon dioxide and/or alkylene oxide are added continuously, the rate of addition of each of these may be constant during the course of step d). Alternatively, the rate of addition of the continuously added materials may vary during the course of step d).

If either or both of the carbon dioxide and alkylene oxide are added intermittently, it is preferred to add in any single increment no more than 25% of the total amount carbon dioxide or alkylene oxide, as the case may be, in any single increment. When added incrementally, either of these materials may be added in at least 4, at least 6, at least 10, or at least 20 increments, to any greater number of increments. The various increments do not have to be equal in amount, although they can be.

Either or both may be fed on demand by feeding them at a rate that maintains a constant internal reactor pressure. In some embodiments, the carbon dioxide is fed continuously on demand, and the propylene oxide is added separately, as a continuously or intermittently added stream. In a particular embodiment, the carbon dioxide is fed continuously on demand and the alkylene oxide is added at a fixed rate in proportion to the rate of carbon dioxide addition. In another particular embodiment, the carbon dioxide is fed continuously on demand and the alkylene oxide is fed continuously at a constant rate.

The mole ratio of carbon dioxide to alkylene oxide fed during step d) may be, for example, from 0.005:1 (0.005 moles of carbon dioxide per mole of alkylene oxide) to 1:1. The mole ratio may be at least 0.01:1, at least 0.05:1, at least 0.1:1, at least 0.25:1, at least 0.6:1, or at least 0.8:1. It is preferred that the rates and manner of addition of carbon dioxide and alkylene oxide are such that these mole ratios are maintained throughout step d), until such time as the carbon dioxide and alkylene oxide feeds are discontinued. It is most preferred to feed the carbon dioxide and alkylene oxide simultaneously at the foregoing ratios during step d).

The total amount of carbon dioxide and alkylene oxide is selected to produce the desired molecular weight of the product.

In some embodiments, the alkylene oxide is propylene oxide, which is stored in and fed into the process from a container vessel that is padded with carbon dioxide, i.e., has an atmosphere that is at least 50 mole-% and preferably at least 90 mole-% or at least 95 mole-% carbon dioxide. The atmosphere in the container vessel may contain no more than 10 mole-%, no more than 5 mole-% or no more than 2 mole-% nitrogen. It has been found that when the container vessel is padded with nitrogen or a gas that contains a significant fraction of nitrogen, a portion of the nitrogen becomes dissolved in the propylene oxide and is carried into the reaction vessel where it occupies a portion of the headspace. Removing or reducing this source of nitrogen permits lower operating pressures in the reaction vessel (due to the absence of the nitrogen carried in with the propylene oxide) and/or at an equivalent pressure allows a greater carbon dioxide concentration to be present. This leads to more efficient carbon dioxide incorporation and higher carbon dioxide contents in the polycarbonate.

Step d) of the process is performed without product removal, which results in a semi-batch mode of operation.

After all of the carbon dioxide and alkylene oxide have been fed, the resulting reaction mixture may be digested under polymerization conditions to consume some or all of the unreacted monomers. It is generally preferable to digest the mixture until the reaction mixture contains no more than 0.5%, no more than 0.25% or no more than 0.1% by weight of unreacted alkylene oxide.

The product is recovered from the reaction vessel after step d). If the optional digestion step is performed, the product is recovered after the digestion step is completed. Product recovery includes removal of the product from the reaction vessel and separation of the polymeric product from at least some of the unreacted monomers. The vessel may be vented to separate unreacted gaseous monomers from the product. The product may be stripped with an inert gas such as nitrogen or argon to remove residual unreacted monomers and/or reaction by-products such as alkylene carbonates that can form via a reaction of carbon dioxide with the alkylene oxide. The product may alternatively or in addition be treated using methods such as thin film evaporation, liquid-liquid extraction, washing and the like. Catalyst residues can be removed and/or neutralized if desired. One or more stabilizers, antioxidants and/or preservatives can be added to the product. The product preferably is stored in a moisture-free and non-oxidizing environment, such as under an inert atmosphere such as nitrogen or argon.

The product of the polymerization reaction is a polycarbonate or polyether-polycarbonate. The carbonate content of the product, as measured using an NMR method such as described in U.S. Pat. No. 9,062,156, may be, for example, at least 0.5 weight-%, at least 5 weight-%, at least 10 weight-%, at least 20 weight-% or at least 30 weight-%, based on the weight of the polymer, and may be up to about 40 weight-%. It has been found that carbonate content may depend on the particular catalyst used. Double metal cyanide catalyst complexes tend to form polymers having carbonate contents of 0.5 to 30 weight-% or 5 to 25 weight percent, whereas polymers produced in the presence of catalysts having Structure I below or in the presence of metal complexes of tetradentate ligands tend to have a higher range of carbonate contents, such as from 10 to 40 weight-% or 25 to 40 weight-%.

The product polymer contains one or more hydroxyl groups, the number of which corresponds closely to the average number of hydroxyl groups of the starter. The average number of hydroxyl groups of the starter is designated the "nominal functionality" of the product polymer. A small amount of unsaturated monoalcohols may form due to side-reactions that occur during the polymerization, so the actual hydroxyl functionality of the product is often somewhat lower than the nominal functionality when the starter is polyfunctional. Actual functionality is determined by measuring the equivalent weight using well-known titration methods, determining number average molecular weight by gel permeation chromatography, and dividing the equivalent weight by number average molecular weight. The actual functionality may be, for example, from 1.0 to 8, from 1.8 to 4, or from 1.8 to 3.

The number average molecular weight of the product may be, for example, 700 to 10,000, 1000 to 5000, 1000 to 3500 or 1000 to 2500 g/mol. The hydroxyl equivalent weight may be, for example, 233 to 10,000, 400 to 2000 or 400 to 1000.

The carbonate catalyst is a catalyst for the copolymerization of carbon dioxide and the alkylene oxide. Examples of suitable catalysts include those described in WO 2009/130470 and U.S. Pat. No. 9,006,347, which are incorporated herein by reference. Such catalysts include those having Structure I:

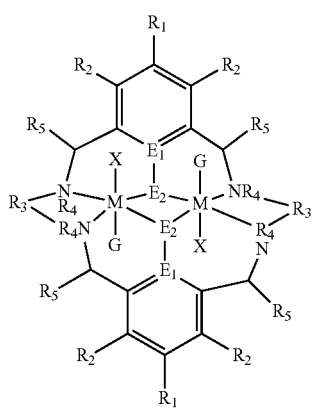

wherein $R_1$ and $R_2$ are independently hydrogen, halide, a nitro group, a nitrile group, an imine, an amine, an ether group, a silyl ether group, or an acetylide group or an optionally substituted alkyl, alkenyl, alkynyl, haloalkyl, aryl, heteroaryl, alicyclic or heteroalicyclic group; $R_3$ is independently optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic; $R_4$ is independently H, or optionally substituted aliphatic, heteroaliphatic, alicyclic, heteroalicyclic, aryl, heteroaryl, alkylheteroaryl or alkylaryl; $R_5$ is H, or optionally substituted aliphatic, heteroaliphatic, alicyclic, heteroalicyclic, aryl, heteroaryl, alkylheteroaryl or alkylaryl; $E_1$ is C and $E_2$ is O, S or NH; or $E_1$ is N and $E_2$ is O; X is independently $OC(O)R^x$, $OSO_2R^x$, $OSOR^x$, $OSO(R^x)_2$, $OR^x$, phosphinate, halide, nitrate, hydroxyl, carbonate, amido or optionally substituted aliphatic, heteroaliphatic, alicyclic, heteroalicyclic, aryl or heteroaryl; $R^x$ is independently hydrogen, or optionally substituted aliphatic, haloaliphatic, heteroaliphatic, alicyclic, heteroalicyclic, aryl, alkylaryl or heteroaryl; G is absent or independently a neutral or anionic donor ligand which is a Lewis base; and M is independently Zn(II), Cr(II), Co(II), Mn(II), Ti(II), Mg(II), Fe(II), Cr(III)-X, Co(III)-X, Mn(III)-X, Fe(III)-X, Ca(II), Ge(II), Al(III)-X, Ti(III)-X, V(III)-X, Ge(IV)-(X)$_2$ or Ti(IV)-(X)$_2$.

Other suitable catalysts include metal complexes of tetradentate ligands as described, for example, in WO 2010/028362, WO2010/062703 and WO 2012/071505, all incorporated by reference. Such catalysts include, for example, a metal salen complex, metal salan complex, a metal bis-2-hydroxybenzamido complex, a metal complex with the Trost ligand, a metal porphyrin complex, a metal tetrabenzoporphyrin complex, a metal corrole complex, a metal phthalocyaninate complex or a metal dibenzotetramethyltetraaza [14]annulene.

Other suitable catalysts include double metal cyanide (DMC) complexes as described, for example in U.S. Pat. Nos. 3,278,457; 3,278,458; 3,278,459; 3,404,109; 3,427,256; 3,427,334; 3,427,335; and 5,470,813. Exemplary DMC catalysts can be represented by Formula 1:

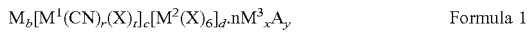

wherein M and $M^3$ are each metals: $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3_xA_y$, and n is zero or a positive integer. The foregoing formula does not reflect the presence of neutral complexing agents such as t-butanol which are often present in the DMC catalyst complex. In exemplary embodiments, r is 4 or 6, t is 0. In some instances, r+t will equal six.

For example, M and $M^3$ may each be a metal ion independently selected from the group of $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$. $M^1$ and $M^2$ may each be selected from the group of $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$. Among the foregoing, those in the plus-three oxidation state may be used as the $M^1$ and $M^2$ metal (e.g., $Co^{+3}$ and $Fe^+$). Suitable anions A include, but are not limited, to halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate.

An exemplary type of DMC catalyst is a zinc hexacyanocobaltate, which may be complexed with t-butanol.

A DMC catalyst may be used in conjunction with a promoter. Suitable promoters include those described in WO 2012/091968, incorporated by reference. Those promoters include compounds in which a magnesium, Group 3-Group 15 metal, or lanthanide series metal ion bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion. The catalyst promoter is devoid of halide and cyanide ions. The promoter compound may be devoid of sulfate, sulfite, persulfate, nitrate, nitrite, chlorate, perchlorate, hypochlorite, carbonate, chromate, sulfonate (such as trifluoromethylsulfonate and methyl sulfonate) and hydroxide anions.

The metal of the promoter compound may be any falling within any of Groups III through 15, inclusive, or the lanthanide series, of the 2010 IUPAC periodic table of the elements. The metal may be, e.g., scandium, yttrium, lanthanum, titanium, zirconium, hafnium, vanadium, niobium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, aluminum, gallium, indium, tellurium, germanium, tin, lead, antimony, bismuth, and the lanthanide series metals including those having atomic numbers from 58 (cerium) to 71 (lutetium), inclusive.

The polymer product is useful to make a wide variety of polyurethane products, such as slabstock foams, molded foams, flexible foams, viscoelastic foams, combustion modified foams, rigid foams, elastomers, adhesives, sealants, and/or coatings. The polyurethane product may be useful in a variety of packaging applications, comfort applications (such as mattresses, mattress toppers, pillows, furniture, seat cushions, etc.), shock absorber applications (such as bumper pads, sport and medical equipment, helmet liners, etc.), thermal insulation applications, electro-conductivity for anti-static packaging of electronic goods, and noise and/or vibration dampening applications (such as earplugs, automobile panels, etc.)

The polyurethane product may be prepared in a reaction of a polyurethane forming formulation that includes an isocyanate component and an isocyanate-reactive component. The isocyanate component may include one or more polyisocyanates, one or more isocyanate-terminated prepolymers, and/or a combination thereof. The product polymer may form all or part of the isocyanate-reactive component, and/or may be used to make an isocyanate-terminated prepolymer that forms all or part of the isocyanate component.

With respect to the isocyanate component, exemplary isocyanates include aromatic, cycloaliphatic, and aliphatic isocyanates, and isocyanate-terminated prepolymers derived from at least one selected from the group of aromatic, cycloaliphatic, and aliphatic isocyanates. The amount of isocyanate component used in making a polyurethane product is commonly expressed in terms of isocyanate index. The isocyanate index is 100 times the number of isocyanate groups in the formulation divided by the number of isocyanate-reactive groups. In embodiments, the isocyanate index may range from about 70 to 400.

Various additives may be added to the reaction mixture for forming the polyurethane product to adjust characteristics of the resultant product, e.g., additives known to those of ordinary skill in the art may be used. Additives may be added as part of the isocyanate component and/or the isocyanate-reactive component. Exemplary additives include a catalyst, an adhesion promoter, a surfactant, a moisture scavenger, a cell opener, an antioxidant, a curative, a pH neutralizer, a UV stabilizer, an antistatic agent, a plasticizer, a compatibilizer, a filler, a reinforcing agent, a flame retardant, pigments/dyes, a mold release agent, and/or a crosslinker.

The following examples are provided to illustrate the invention but are not intended to limit the scope thereof. All parts and percentages are by weight unless otherwise indicated.

Example 1

5 grams of a metal-containing carbonate catalyst are mixed with 25.4 g of a 400 molecular weight poly(propylene oxide) diol under dry conditions. About 15 mL of anhydrous solvent are added and the reactor contents mixed until the solids have dissolved. The resulting solution is charged to a pressure reactor together with another 140.1 g of anhydrous solvent. The reactor is pressurized to 550 kPa gauge with carbon dioxide and vented three times, sealed, heated to 70° C. and then pressurized to 620 kPa gauge (90 psig) with carbon dioxide. 51.3 mL (42.6 g) of propylene oxide are fed to the reactor. When the internal reactor pressure drops (indicating that polymerization has begun), carbon dioxide and propylene oxide are fed on demand to the reactor at a 1:1 mole ratio for 24 hours, while maintaining the internal reactor pressure at or below 965 kPa gauge (140 psig). The reactor is then cooled and vented. The product is stripped with nitrogen and 8.17 g of phosphoric acid are stirred in for 30 minutes before transferring the product into a container, which is then sealed. The product has a number average molecular weight of 1175 g/mol by gel permeation chromatography (GPC) and a polydispersity (weight average molecular weight divided by number average molecular weight) of 1.12.

Example 2

6.5 grams of a metal-containing carbonate catalyst are mixed with 340 g of anhydrous solvent under dry conditions, followed by 123.46 g of a 400 molecular weight poly (propylene oxide) diol. The resulting solution is charged to a pressure reactor. The reactor is pressurized to 550 kPa gauge with carbon dioxide and vented three times and sealed. 142.4 mL (118.1 g) of propylene oxide are fed to the reactor. The reactor is heated to 70° C. and then pressurized to 620 kPa gauge with carbon dioxide. When the internal reactor pressure drops (indicating that polymerization has begun), carbon dioxide and propylene oxide are fed on demand to the reactor at a 1:1 mole ratio for 24 hours, while maintaining the internal reactor pressure at or below 965 kPa gauge. The reactor is then cooled and vented. The product is stripped with nitrogen and 8.17 g of phosphoric acid are stirred in for 30 minutes before transferring the product into a container, which is then sealed. The product has a number average molecular weight of 1299 g/mol by GPC and a polydispersity of 1.10.

Example 3

0.05 grams of zinc hexacyanocobaltate catalyst complex and 0.5 grams of aluminum isopropoxide are dissolved in 99.6 grams of a 700 molecular weight, trifunctional poly (propylene oxide). The mixture is dried in a 1 liter reactor by purging with nitrogen at 130° C. Then, the reactor is heated to 150° C. and an initial charge of 18.4 mL (15.3 g) of propylene oxide is added to activate the catalyst. When the internal reactor pressure declines, indicating the catalyst has become active, the reactor is cooled to 100° C. and pressurized three times to 480 kPa gauge followed each time by venting. The reactor then is pressurized to 725 kPa gauge with a mixture of propylene oxide and carbon dioxide. Propylene oxide and carbon dioxide are fed on demand until 75.9 g of propylene oxide and 12.5 grams of carbon dioxide have been added over a period of 2.5 hours at 100° C. The reactor contents are then digested at 100° C. until a constant pressure within the reactor indicates that polymerization has ceased. The reactor is cooled and vented. The contents of the reactor then are purged with nitrogen for 30 minutes with stirring and transferred into containers, which are then sealed. The product has a number average molecular weight of 1227 and contains 3.4 mol-% polymerized carbon dioxide.

Examples 4-6

Example 4: 0.015 grams of zinc hexacyanocobaltate catalyst complex and 0.056 grams of aluminum isopropoxide are dissolved in 144.2 grams of a 700 molecular weight, trifunctional poly(propylene oxide). The mixture is dried in a 1 liter reactor by purging with nitrogen at 130° C. Then, the reactor is heated to 150° C. and an initial charge of 26.7 mL (22.2 g) of propylene oxide is added to activate the catalyst. When the internal reactor pressure declines, indicating the catalyst has become active, the reactor is cooled to 90° C. and pressurized three times to 480 kPa gauge followed each time by venting. The reactor then is pressurized to 825 kPa gauge with carbon dioxide. 13.4 g of propylene oxide are added. Thereafter, propylene oxide is fed into the reactor at a rate of 1 mL/minutes (0.83 g/minute) until a total of 227.8 grams have been fed. Simultaneously, carbon dioxide is fed on demand to maintain an internal reactor pressure of 825±2.5 kPa gauge. Reactor temperature is maintained at 90° C. throughout. The reactor contents are then digested at 90° C. until a constant pressure within the reactor indicates that polymerization has ceased. The reactor is cooled and vented. The contents of the reactor then are purged with nitrogen for 30 minutes with stirring and transferred to containers, which are then sealed. The product has a number average molecular weight of 1395 g/mol and contains 7.9 mol-% polymerized carbon dioxide.

Example 5 is made in the same manner, except the temperature is 120° C. and the pressure is 620 kPa gauge. The product contains only 2% by weight polymerized carbon dioxide. When the temperature is further increased to 150° C. and the pressure decreased to 415 kPa, the product (Example 6) contains only 0.2 weight percent polymerized carbon dioxide.

What is claimed is:

1. A semi-batch process for making a polycarbonate polyol, comprising the steps of:
   a) combining a hydroxyl-containing starter compound, a carbonate catalyst and 0.25 to 5 moles of alkylene oxide per mole of the hydroxyl-containing starter compound in a reaction vessel;
   b) introducing carbon dioxide into the reaction vessel;
   c) initiating polymerization of the carbon dioxide and alkylene oxide by subjecting the hydroxyl-containing starter compound, carbonate catalyst, alkylene oxide and carbon dioxide in the reaction vessel to polymerization conditions that include a temperature of at least 40° C. and a pressure of at least 138 kPa gauge (20 psig);
   d) continuously or intermittently feeding additional alkylene oxide and carbon dioxide to the reaction vessel under polymerization conditions including a temperature of 50 to 90° C. and a pressure of 275 kPa to 1.1 MPa gauge without removal of product such that the alkylene oxide and carbon dioxide copolymerize to form the polycarbonate, wherein in step d), the alkylene oxide and carbon dioxide are fed to the reaction vessel simultaneously, and alkylene oxide is fed to the reaction vessel at a ratio of 0.005 to 1.0 moles of carbon dioxide per mole of alkylene oxide and the molar ratio of carbon dioxide to alkylene oxide within the reactor during the entire course of step d) is maintained at a ratio of 0.005 to 1.0 moles of carbon dioxide per mole of alkylene oxide; and
   e) after all the alkylene oxide has been fed to the reaction vessel, recovering the product polycarbonate polyol from the reaction vessel.

2. The semi-batch process of claim 1 wherein step b) is performed by pressurizing the reaction vessel with carbon dioxide.

3. The process of claim 1 wherein in step d), the alkylene oxide and carbon dioxide are fed to the reaction vessel simultaneously, and alkylene oxide is fed to the reaction vessel at a ratio of 0.25 to 1.0 moles of carbon dioxide per mole of alkylene oxide.

4. The process of claim 1 wherein the carbonate catalyst includes at least one compound corresponding to Structure I

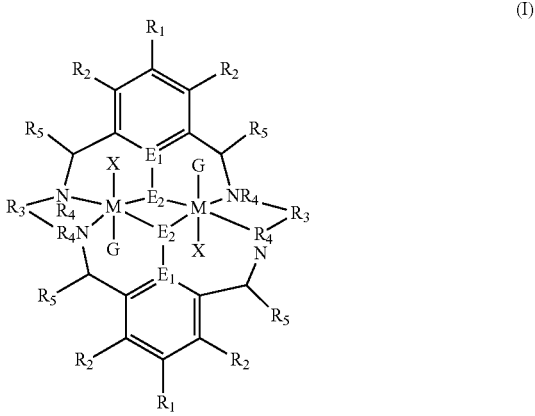

wherein $R_1$ and $R_2$ are independently hydrogen, halide, a nitro group, a nitrile group, an imine, an amine, an ether group, a silyl ether group, or an acetylide group or an optionally substituted alkyl, alkenyl, alkynyl, haloalkyl, aryl, heteroaryl, alicyclic or heteroalicyclic group; $R_3$ is independently optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic; $R_4$ is independently H, or optionally substituted aliphatic, heteroaliphatic, alicyclic, heteroalicyclic, aryl, heteroaryl, alkylheteroaryl or alkylaryl; $R_5$ is H, or optionally substituted aliphatic, heteroaliphatic, alicyclic, heteroalicyclic, aryl, heteroaryl, alkylheteroaryl or alkylaryl; $E_1$ is C and $E_2$ is O, S or NH; or $E_1$ is N and $E_2$ is O; X is independently $OC(O)R^x$, $OSO_2R^x$, $OSOR^x$, $OSO(R^x)_2$, $OR^x$, phosphinate, halide, nitrate, hydroxyl, carbonate, amido or optionally substituted aliphatic, heteroaliphatic, alicyclic, heteroalicyclic, aryl or heteroaryl; $R^x$ is independently hydrogen, or optionally substituted aliphatic, haloaliphatic, heteroaliphatic, alicyclic, heteroalicyclic, aryl, alkylaryl or heteroaryl; G is absent or independently a neutral or anionic donor ligand which is a Lewis base; and M is independently Zn(II), Cr(II), Co(II), Mn(II), Ti(II), Mg(II), Fe(II), Cr(III)-X, Co(III)-X, Mn(III)-X, Fe(III)-X, Ca(II), Ge(II), Al(III)-X, Ti(III)-X, V(III)-X, Ge(IV)-$(X)_2$ or Ti(IV)-$(X)_2$.

5. The process of claim 1 wherein the carbonate catalyst includes at least one metal complex of a tetradentate ligand.

6. The process of claim 1 wherein the carbonate catalyst includes at least one double metal cyanide complex.

7. The process of claim 6 wherein during steps c) and d) the reaction vessel further contains at least one compound in which a magnesium, Group 3-Group 15 metal, or lanthanide series metal ion is bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion.

8. The process of claim 1 wherein the pressure during step d) is 275 kPa to 965 kPa gauge.

9. The process of claim 1 wherein the alkylene oxide is propylene oxide.

10. The process of claim 9 wherein the alkylene oxide is stored in and fed into the reaction vessel from a container vessel that has an atmosphere that is at least 50 mole-% carbon dioxide and no more than 10 mole-% nitrogen.

\* \* \* \* \*